United States Patent Office 3,751,565
Patented Aug. 7, 1973

3,751,565
THERAPEUTIC COMPOSITIONS
Salvatore L. Santorelli, 160—54 10th Ave.,
Whitestone, N.Y. 11357
No Drawing. Continuation-in-part of application Ser. No. 754,098, Aug. 12, 1968, which is a continuation of application Ser. No. 507,515, Nov. 12, 1965, which is a continuation-in-part of application Ser. No. 431,714, Feb. 10, 1965, which is a continuation-in-part of application Ser. No. 220,907, Aug. 31, 1962, which is a continuation-in-part of application Ser. No. 852,174, Nov. 12, 1959, which in turn is a continuation-in-part of application Ser. No. 773,809, Nov. 14, 1958, all now abandoned. This application Mar. 11, 1970, Ser. No. 18,717

Int. Cl. A61k 27/00
U.S. Cl. 424—80
4 Claims

ABSTRACT OF THE DISCLOSURE

The present invention is directed to a composition having a complex compound therein, the composition being useful as a bactericidal and fungicidal agent or in the treatment of burns. The composition comprises 100 cc. of 60–70% alcohol or propylene glycol, about 18 to 22 grams of salicylic acid, about 0.1 to 2 grams of an iodine antiseptic such as polyvinylpyrrolidone-iodine or iodine/sodium iodide and 0.1 to 2 grams of a mercurial antiseptic such as 0.1 to 2 grams of sodium ethylmercurithiosalicylate or sodium dibromoxymercurifluorescein which form a complex compound, with salicylic acid being present in excess of 10 grams in the composition. The present invention also includes the complex compound of salicylic acid, an iodine antiseptic such as polyvinylpyrrolidone-iodine or iodine/sodium iodide and a mercurial antiseptic such as sodium ethylmercurithiosalicylate or sodium dibromoxymercurifluorescein, which can be used in solutions, ointments or sprays.

---

The present application is a continuation-in-part of my co-pending application Ser. No. 754,098 filed Aug. 12, 1968 which was a continuation of application Ser. No. 507,515 filed Nov. 12, 1965 which was a continuation-in-part of application Ser. No. 431,714 filed Feb. 10, 1965 which was a continuation-in-part of application Ser. No. 220,907 filed Aug. 31, 1962 which was a continuation-in-part of application Ser. No. 852,174 filed Nov. 12, 1959 which was a continuation-in-part of application Ser. No. 773,809 filed Nov. 14, 1958, all now abandoned.

The present invention relates to therapeutic compositions for topical application having keratolytic and keratoplastic properties including bactericidal and fungicidal effects on skin disorders due to fungus and/or bacterial infections. The compositions of this invention are also useful in the treatment of 2nd degree burns. The compositions of the invention are saturated solutions of salicylic acid, 18–22 grams in propylene glycol or in 60–70% alcohol together with 0.1 to 2 grams of iodine and 0.1 to 2 grams of mercury containing-antiseptics such as polyvinylpyrrolidone iodine (Isodine ®), iodine/sodium iodide, sodium dibromoxymercurifluorescein (Mercurichrome ®), and sodium ethyl-mercurithiosalicylate (Merthiolate ®), wherein there is present in solution salicylic acid in excess of 10 grams per 100 cc. of an aliphatic alcohol after the addition of all the antiseptics which have reacted.

It has been known and practiced by those skilled in the art that the demarkation between a weak solution and a strong solution of salicylic acid in an alcohol is placed at 6%, gm. per 100 cc.) salicylic acid for the treatment of all kinds of skin infections. A strong solution of 12% (gm. per 100 cc.) salicylic acid in alcohol has shown keratolytic action and has been cautiously used only in cases of unbroken skin, for example, in the removal of corns, warts and horny layers of skin. The use of a strong solution of salicylic acid causes inflammation of the painted areas with attendant damage to capillary blood vessels and the formation of blisters on broken or infected skin; the strong solution smarts and pains causing inflammation of the treated area and edema. A weak solution of salicylic acid (below 6%) having geratoplastic action removes inflammation and reduces edema with attendant healing of the infected area (Goodman, Cosmetic Dermatology, McGraw-Hill Book Co. (1936) pages 454–459). The antiseptics used individually such as polyvinylpyrrolidone (Isodine ®), iodine/sodium iodide, sodium dibromoxymercurifluorescein (Mercurichrome ®), and sodium ethylmercurithiosalicylate (Merthiolate ®), have a certain degree of bactericidal and fungicidal properties and have been used in prolonged treatment on mild cases of fungicidal or bactericidal infectons. However, these antiseptics used individually have little effect in acute and chronic cases of fungicidal or bactericidal infections and in some infections are totally ineffectual. These antiseptics do not possess the broad fungicidal and bactericidal effectiveness of the composition of the present invention which is capable of combating acute and chronic fungicidal and/or bactericidal infections with normally two to four applications of said composition without traumatic effects.

Cornbleet (Arch. Dermatology, March 1948, pages 335-336) used polyvinylpyrrolidone iodine and clearly stated that in order to effect any clearing of a condition such as eczmatoid ringworm, it is required that the polyvinylpyrrolidone iodine be applied to the infected area twice a day over a prolonged period of time. The composition of the present application, as set forth in the examples, required in most every instance only one to three applications of the composition once a day over a 24 to 72 hour period of time to clear the infected area with a replacement of new healthy epithelial tissue.

The compositions of the present invention contain in a solution of 100 cc. of propylene glycol or 60–70% alcohol, salicylic acid in excess of 10 grams including the reaction product of the antiseptics. These compositions have been used in the treatment of 2nd degree burns and of acute and chronic skin diseases such as athlete's foot, intertrigo, seborrhoeic keratoses, monilia vaginitis, etc. which had not responded or poorly responded to any other form of therapy. In most cases only two to three applications of these compositions were required to relieve and heal the infected area. These compositions which contain 18–22 grams of salicylic acid in 100 cc. of propylene glycol or 60–70% aqueous alcohol, in the light of prior medical art, are considered to be strong solutions of salicylic acid harmful to living tissue, however, actually appear to attack only the infected area and to have no effect on the healthy surrounding tissue giving immediate relief to the patient. The inflammation caused by the fungus and/or bacteria subsides and disappears with no attendant edema or damage to the capillary blood vessels even though the solutions containing in excess of 10 grams of salicylic acid, according to the present invention, are applied to said infected area.

To effect good healing it is necessary that all the infected tissue is cleared away as tissue debris from an infected area and for this purpose a keratolytic action is required. The prior art cites salicylic acid as a good keratolytic agent if used in excess of 10 grams, however because of its severe action in high concentrations it is never used on living tissue or in open infected areas. Goodman adequately covers this. The solutions listed hereinafter retain their keratolytic nature in spite of the high concentration of salicylic acid without any of the severe action attendant thereto when salicyclic acid is used alone. The compositions of this application also have a keratoplastic action as evidenced with acceleration of growth of new healthy tissue when applied to infected skin areas as evidenced in the clinical studies. Therefore the compositions have evidenced both a keratolytic and keratoplastic action when applied to fungicidal or bactericidal infections without traumatic effect.

The compositions of the present invention were tested with the following results:

Several cases of tinea pedis (athlete's foot) were treated by one to three applications of typical compositions of the invention. It was observed that on applying the compositions to the infected areas, which had skin break with attendant discharge and itchiness, all signs of infection disappeared within twenty-four hours. The infected skin with fission in the infected areas peeled off leaving new skin in place thereof, closing the said skin break. In comparing the effect of the individual components of the mixtures of this invention with the compositions of the present invention, in the average infected patient, it took at least a week or more to clear up athlete's foot with said components; whereas with the present inventive compositions, the fungus condition was greatly alleviated with marked visual improvement within twenty-four hours. Growth of new skin was also observed within said period of time. Patients having both acute and chronic infections were given up to three applications of the composition. All of these patients were immediately relieved of their itchiness and of their acute symptoms, including puritus, intense erythema, vesication and fissuring, with resultant healing.

Three patients were treated for seborrheoeic keratoses with scalp lesions by applying the present inventive compositions with cotton wound applicators. All of the keratoses healed in a few days.

Seborrhoeic dermatitis with fissuring was treated by painting the infected area; all showed marked improvement and healing.

Several patients were treated for intertrigo, under the breasts, in the axillae and in the groins with two to three applications of the compositions. The condition in all the patients was cleared up.

Patients were treated for monilia vaginitis with compositions of this invention and it was found to be an effective treatment of monilia infections which had not responded to any other form of therapy.

The solutions used showed unusual properties for stimulating healing in chronic and acute fissuring of the skin. The patients evidenced an intense smarting only of the infected area when painted with the compositions of the present invention which smarting in some instances lasted for five minutes; however, no traumatic effect or injury to the skin or mucous membranes was evidenced as a result. The unbearable condition of itchiness in all cases immediately subsided and did not recur.

A number of patients were treated for 2nd degree burns. A single application of the composition of the present invention was applied to the burned areas. The area healed completely in a few days. No dressing was required.

The compositions of the present invention have the further advantages in that they protect the wound from infection allowing it to heal normally and rapidly forming a protective coating and obviates the need for bulky dressings.

A number of propylene glycol and aqueous alcoholic solutions were prepared using 60 to 70 vol. percent alcohol and 40 to 30 vol. percent H$_2$O, preferentially a lower aliphatic alcohol such as methyl, ethyl or isopropyl alcohol was used in which 18 to 22 grams of salicylic acid was dissolved. 100 cc. of 70% alcohol will dissolve no more than 22 grams of salicylic acid at room temperature. In other words, a saturated solution or preferentially 20 grams of salicylic acid was prepared in the alcohol or 18 grams of salicylic acid in 100 cc. propylene glycol. To these solutions was added 0.1 to 2 grams of any of the following antiseptics, sodium dibromoxymercurifluorescein (Mercurichrome®), iodine/sodium iodide, sodium ethylmercurithiosalicylate (Merthiolate®) or polyvinylpyrrolidone iodine complex (Isodine®), the mercurials in combination with the iodine compounds so that in excess of 10 grams of salicylic acid remains in the composition after said addition. All of these above compositions were medically tested.

These solutions were prepared by the addition of 0.1 to 2 grams of polyvinylpyrrolidone-iodine complex (Isodine®) or iodine/sodium iodine, an endothermic reaction was evidenced, coloring the solution brownish-red; thereafter 0.1 to 2 grams of sodium ethylmercurithiosalicylate (Merthiolate®) was added with the immediate and instantaneous changing of the solution from a brownish-red solution to a colorless solution. It was impossible to identify or determine the structure of the product of reaction since the compound or complex formed broke down under all analytical procedures. It was unable to determine the amount of acid reacted.

There is nothing generally known about these ingredients which would suggest that they should form a complex or change color.

When the alcoholic compositions or propylene glycol compositions prepared according to present invention were tested in vitro, they showed the following results:

(A)

(1a) Prevented growth of *Staphylococcus aureus* (FDA #209) in a dilution of 1:1000. Phenol coefficient of the solution against the *Staphylococcus aureus* equaled 2.5.

(1b) Prevented growth of *Trichophyton mentographytes* (ATCC #4807) in a dilution of 1:100.

(2) Prevented growth of *Salmonella typhosa* (ATCC #6539) in dilution of 1:100. Phenol coefficient of the solution against *Salmonella typhosa* equaled 3.3.

(3) Prevented growth of *Streptococcus hemolyticus* (P & S #15–A) in a dilution of 1:100.

(4) Prevented growth of *Mycobacterium smegmitis* (ATCC #10143).

(5) Prevented growth of *Mycobacterium tuberculosis* var. *hominis* (H37RA).

(B)

Prevented growth in the following fungus and one yeast:

*Cryptococcus neoformans* (ATCC #10226)
*Microsporum canis* (ATCC #10214)
*Microsporum gypseum* (ATCC #9083)
*Trichoderme veride* (ATCC #8678)
*Candida albicans* (ATCC #752)
*Nocardra asteroides* (ATCC #10904)

In a measurement to determine the oral LD$_{50}$ in rats it was determined that the LD$_{50}$ was 3700 mg./kg. This is a very low level of toxicity. The confidence limits are 2,569 to 5,328 mg./kg. The individual compounds used in the solution of the present invention are toxic, however, these individual compounds are now bound by a chemical reaction, with the solution containing salicyclic acid in excess of 10 grams in said solution, yet evidencing non-toxicity for the solution.

Examples of the therapeutic compositions of the mixture which proved effective in the alcohol or propylene glycol solutions are as follows:

EXAMPLE 1

A solution of 20 grams of salicylic acid in 100 cc. of an aqueous solution of 70% alcohol was prepared. To this solution 1 gram of iodine and 1.4 grams of sodium iodide and 0.1 of a gram of Merthiolate® were added sequentially with mixing.

EXAMPLE 2

A solution of 20 grams of salicylic acid in 100 cc. of an aqueous solution of 70% alcohol was prepared. To this solution 0.1 gram of Isodine® and 0.1 gram of Merthiolate® were added sequentially with mixing.

EXAMPLE 3

A solution of 20 grams of salicylic acid in 100 cc. of an aqueous solution of 70% alcohol was prepared. To this solution 0.1 gram of Isodine® and 0.1 gram of Mercurichrome® were added sequentially with mixing.

EXAMPLE 4

A solution of 20 grams of salicylic acid in 100 cc. of an aqueous solution of 70% alcohol was prepared. To this solution 2 grams of iodine/2.4 grams sodium iodine and 2 grams of Merthiolate® were added sequentially with mixing.

EXAMPLE 5

A solution of 20 grams of salicylic acid in 100 cc. of an aqueous solution of 70% alcohol was prepared. To this solution 2 grams of Isodine® and 2 grams of Merthiolate® were added sequentially with mixing.

EXAMPLE 6

A solution of 20 grams of salicylic acid in 100 cc. of an aqueous solution of 70% alcohol was prepared. To this solution 2 grams of Isodine® and 2 grams of Mercurichrome® were added sequentially with mixing.

EXAMPLE 7

18 grams of salicylic acid was dissolved in 100 cc. of propylene glycol. To this solution 0.1 gram of Isodine® and 0.1 gram of Merthiolate® were added sequentially with mixing.

EXAMPLE 8

18 grams of salicylic acid was dissolved in 100 cc. of propylene glycol. To this solution 2 grams of Isodine® and 2 grams of Merthiolate® were added sequentially with mixing.

EXAMPLE 9

18 grams of salicylic acid was dissolved in 100 cc. of propylene glycol. To this solution 1 gram of iodine/1.4 grams of sodium iodide and 0.1 gram of Merthiolate® were added sequentially with mixing.

EXAMPLE 10

18 grams of salicylic acid was dissolved in 100 cc. of propylene glycol. To this solution 2 grams of iodine/2.4 grams of sodium iodide and 2 grams of Merthiolate® were added sequentially with mixing.

EXAMPLE 11

18 grams of salicylic acid was dissolved in 100 cc. of propylene glycol. To this solution 0.1 gram of Isodine® and 0.1 gram Mercurichrome® were added sequentially with mixing.

EXAMPLE 12

A solution of 20 grams of salicylic acid in 100 cc. of an aqueous solution of 70% alcohol was prepared. To this solution 0.1 gram of Isodine®, 0.1 gram Merthiolate®, 0.1 gram ethanolamine, .03 gram ethylenediamine and 1 cc. of acetone were added sequentially with mixing.

The following table illustrates the various compositions prepared in 100 cc. of propylene glycol, 60–70% alcohol/40–30% water, the alcohol used being preferably ethanol. Good results were obtained throughout using the composition of the invention and most excellent results were obtained using a 20 gram solution of salicylic acid in 60 to 70% alcohol or 18 grams of salicylic acid in propylene glycol.

TABLE

| Salicylic acid in 60–70% alcohol or propylene glycol | Sodium dibromoxymercurifluorescein (grams) | Polyvinylpyrrolidone-iodine complex (grams) | Iodine/sodium iodide (grams) | Merthiolate® (grams) |
|---|---|---|---|---|
| (1) 18–22 grams | | | 0.1–2/1–2.4 | 0.1–2 |
| (2) Salicylic acid/100 cc. alcohol or propylene glycol | | 0.1–2 | | 0.1–2 |
| (3) do | 0.1–2 | 0.1–2 | | |

The use of 70% alcohol is effective for deep penetration and for controlling the amount of salicylic acid (22 grams) which will dissolve in 100 cc. of the alcohol at room temperature.

The compositions of the present invention have a threefold effect, namely a keratolytic action clearing away the infected or diseased tissue, a deep penetration carrying the product of the reaction to the site of the infection and a keratoplastic effect causing a reduction in the inflammation with an acceleration of healing.

Investigation has shown that only the infected areas are attacked by the compositions so that the surrounding healthy skin area is not at all affected.

The compositions described hereinbefore can also find effective veterinarian use. For all purposes they may be applied topically in any conventional manner used for solutions including a spray or in the form of ointments. From a review of the solutions containing the compositions of the present invention and their bactericidal and fungicidal effects, their industrial applications can be readily foreseen.

While there are above disclosed but a limited number of embodiments of the process and products of the invention herein disclosed, it is possible to produce still other embodiments without departing from the inventive concept herein disclosed, and it is desired therefore that only such limitations be imposed on the appended claims as are stated therein.

What I claim is:
1. A topical skin solution having both keratoplastic and keratolytic properties, each 100 cc. of which is prepared by admixture of
   (a) a propylene glycol or 60 to 70% by volume solution of a $C_{1-3}$ alkanol in water,
   (b) about 18 to 22 grams of salicylic acid,
   (c) about 0.1 to 2 grams of polyvinylpyrrolidone-iodine, and
   (d) about 0.1 to 2 grams of sodium ethylmercurithiosalicylate, said solution containing a complex compound of components (b), (c) and (d) and more than 10 grams of free salicylic acid.
2. A solution as defined in claim 1 wherein component (a) is propylene glycol.
3. A solution as defined in claim 1 wherein component (a) is a 70% by volume solution of a $C_{1-3}$ alkanol in water.
4. A solution as defined in claim 3 wherein said alkanol is ethanol.

References Cited
UNITED STATES PATENTS

| | | | |
|---|---|---|---|
| 1,686,062 | 10/1928 | Amacker | 424—51 |
| 2,739,922 | 3/1956 | Shelanski | 424—150 |

RICHARD L. HUFF, Primary Examiner

U.S. Cl. X.R.

424—231, 232, 150; 260—433